United States Patent [19]

Newton

[11] Patent Number: 4,731,991
[45] Date of Patent: Mar. 22, 1988

[54] GAS TURBINE ENGINE THRUST REVERSER

[75] Inventor: Arnold C. Newton, Derby, England

[73] Assignee: Rolls-Royce plc, London, England

[21] Appl. No.: 895,619

[22] Filed: Aug. 12, 1986

[30] Foreign Application Priority Data

Oct. 8, 1985 [GB] United Kingdom ............... 8524801

[51] Int. Cl.$^4$ ................................................ F02K 3/02
[52] U.S. Cl. ................................. 60/226.2; 239/265.31
[58] Field of Search ..................... 60/226.2, 230, 262, 60/226.1, 39.29; 244/110 B; 239/265.31, 265.29; 415/145

[56] References Cited

U.S. PATENT DOCUMENTS

| | | | |
|---|---|---|---|
| 3,262,270 | 7/1966 | Beavers | 60/226.2 |
| 3,262,271 | 7/1966 | Beavers | 60/226.2 |
| 3,779,010 | 12/1973 | Chamay et al. | 60/226.2 |
| 4,026,105 | 5/1977 | James | 60/226.2 |
| 4,030,290 | 6/1977 | Stachowiak | 60/226.2 |
| 4,030,291 | 6/1977 | Sargisson | 60/226.2 |

FOREIGN PATENT DOCUMENTS

| | | | |
|---|---|---|---|
| 109219 | 5/1984 | European Pat. Off. | 60/226.2 |
| 1187491 | 2/1965 | Fed. Rep. of Germany | 239/265.29 |
| 2379705 | 10/1978 | France | 239/265.31 |
| 800770 | 9/1958 | United Kingdom | 239/265.29 |
| 1150012 | 4/1969 | United Kingdom | 60/226.2 |
| 1330904 | 9/1973 | United Kingdom | 60/226.1 |
| 1357370 | 6/1974 | United Kingdom | 60/226.2 |
| 2156004 | 10/1985 | United Kingdom | 60/229 |

Primary Examiner—Louis J. Casaregola
Assistant Examiner—Donald E. Stout
Attorney, Agent, or Firm—Cushman, Darby & Cushman

[57] ABSTRACT

A ducted fan gas turbine engine is provided with a fan cowling member made up of a static portion and an axially translatable portion. A plurality of rails interconnect the first and second cowling member portions and carry a generally annular array of airflow deflector vanes. The deflector vanes are normally stowed in stacked relationship when the cowling portions are contiguous but are equally axially spaced apart to define a fan air flow thrust reverser when the second cowling portion has been translated to a position downstream of the first cowling portion.

11 Claims, 8 Drawing Figures

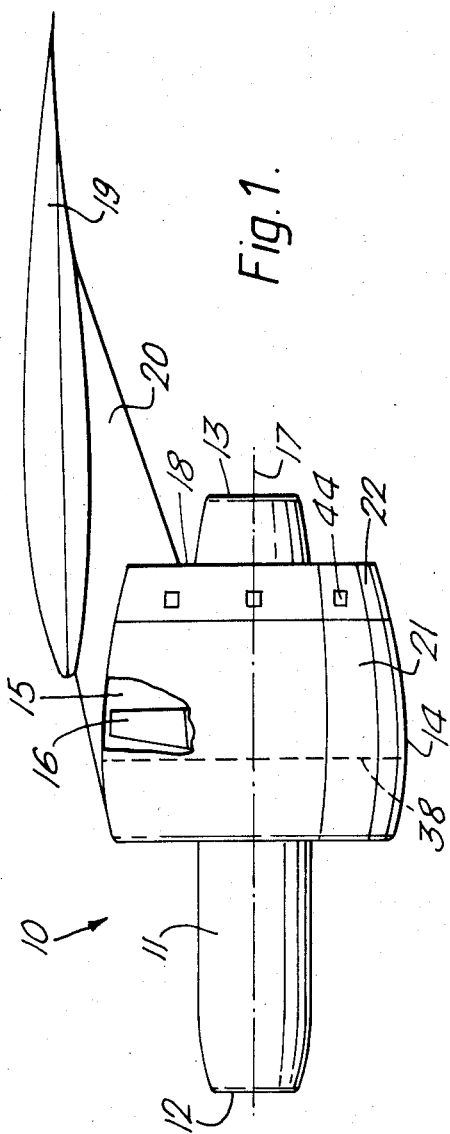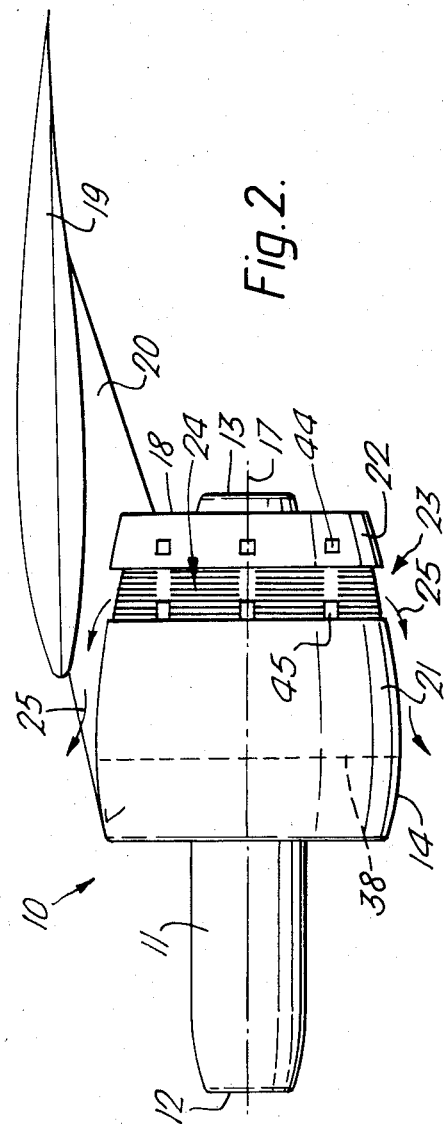

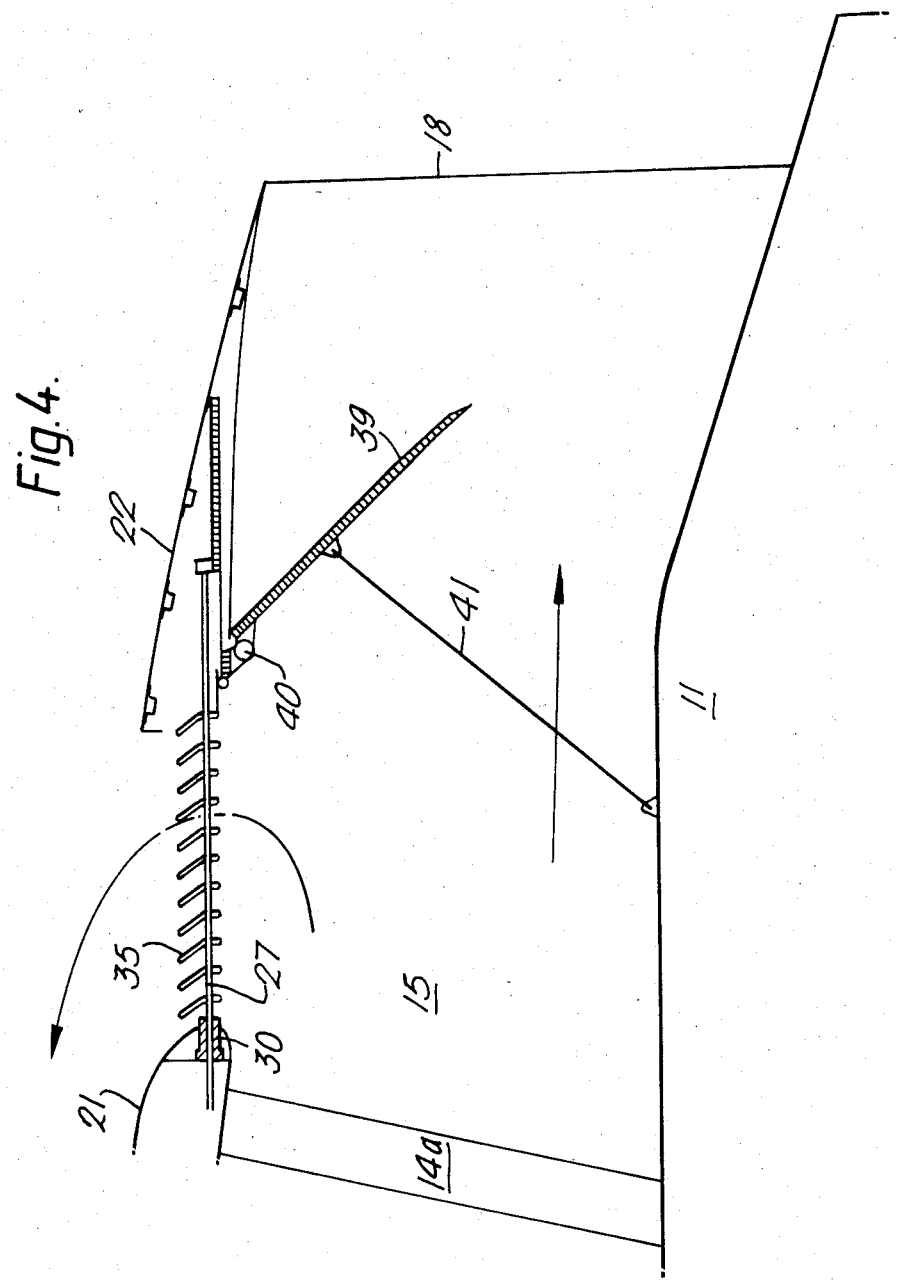

GAS TURBINE ENGINE THRUST REVERSER

This invention relates to a thrust reverser for a gas turbine engine and in particular to a thrust reverser for a gas turbine engine which is provided with a ducted fan propulsor.

Ducted fan gas turbine engines include a ducted fan propulsor which is conventionally located at the upstream end of the engine. It is known to provide such ducted fan gas turbine engines with means for deflecting the flow of air exhausted from the fan so as to provide braking of the aircraft on which the engine is mounted. Such thrust reversing means frequently comprise a plurality of doors which are translatable into positions in which they block the fan air outlet and a plurality of deflector vanes located in the cowling defining the fan duct which are uncovered to define new generally radially directed outlets for the fan air. Thus the fan exhaust air is directed in a generaly radially outward and partially forward direction by the deflector vanes to provide braking.

In a rather less conventional ducted fan gas turbine engine arrangement, the fan and its surrounding cowling defining the fan duct are located towards the downstream end of the engine. This brings problems, however, in the location of a fan air thrust reverser at the downstream end of the fan cowling since very little space is available for the provision of such a reverser. A further problem if the gas turbine engine is one which is mounted from the underside of an aircraft wing by means of a pylon is that of interference of the deflected fan air when the thrust reverser is in operation with the aerodynamics of the aircraft wing. Thus the positioning of the fan towards the downstream end of the engine results in a large proportion of the fan cowling being located adjacent the underside of the wing. Any appreciable lengthening of the engine pylon to position the engine further upstream of the wing is not possible in view of the resultant shift of the engine centre of gravity with respect to the remainder of the aircraft.

It is an object of the present invention to provide a fan air thrust reverser for a ducted fan gas turbine engine which is both compact so as to permit its use on an engine having ducted fan positioned towards the downstream end of the engine and which in use deflects fan air in such a manner as to minimise the effect which the deflected fan air flow has upon the aerodynamics of any aircraft wing from which the engine may be mounted.

According to the present invention, a ducted fan gas turbine engine comprises a core engine having a fan propulsor and a cowling member surrounding and extending downstream of said fan propulsor, said cowling member being radially spaced apart from said core engine so that an annular duct is defined therebetween for the flow of air from said fan propulsor, said cowling member comprising a first static annular portion surrounding said fan propulsor and a second translatable annular portion downstream of said fan which is axially translatable from a first position which is contiguous with said first cowling portion and a second position in which a generally circumferential gap is defined between said cowling member portions, said second translatable cowling portion being interconnected with said first cowling member portion by a plurality of generally axially extending support members which carry a plurality of air flow deflecting members, said airflow deflecting members being translatable along said support members from a first position when said cowling member portions are contiguous in which said airflow deflecting members are stacked in axially abutting relationship to a second position when said circumferential gap is defined between said cowling member portions in which said air flow deflecting members are in spaced apart relationship and in which they occupy at least a major portion of the axial extent of said circumferential gap between said cowling member portions, blocker means being provided to at least partially obturate said annular fan air flow duct downstream of said air flow deflecting members when said cowling member portions are axially separated so that at least a portion of the flow of air operationally exhausted from said fan propulsor passes through said generally circumferential gap and is deflected by said air flow deflector means when in said axially spaced apart relationship, said air flow deflector members being so arranged when axially spaced apart to deflect said air flow in a generally upstream direction.

The invention will now be described, by way of example, with reference to the accompanying drawings in which:

FIG. 1 is a partially broken away side view of a ducted fan gas turbine engine in accordance with the present invention mounted on the wing of an aircraft.

FIG. 2 is a side view of the ducted fan gas turbine engine shown in FIG. 1 showing its thrust reverser in the deployed position.

FIG. 4 is a sectioned side view of the thrust reverser of the ducted fan gas turbine engine shown in FIGS. 1 and 2 in its deployed position.

Figure 3:
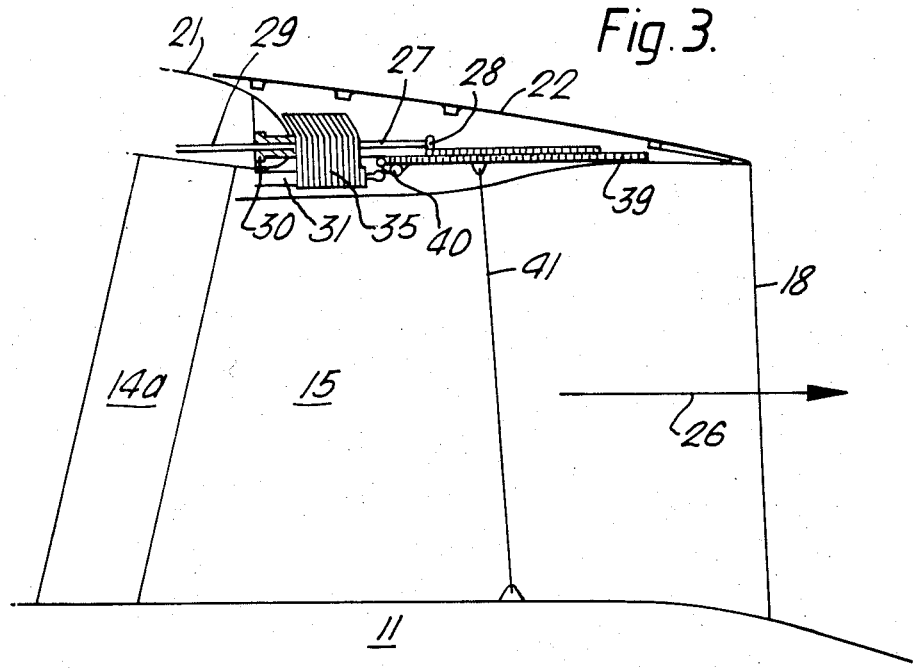
FIG. 3 is sectioned side view of the thrust reverser of the gas turbine engine shown in FIGS. 1 and 2 in its non-deployed position.

With reference to FIG. 1, a ducted fan gas turbine generally indicated at 10 comprises a core engine 11 which is of conventional construction having an air intake 12 compression, combustion and turbine equipment (not shown) and a hot gas propulsion nozzle 13. The downstream portion of the core engine 11 is surrounded by an annular cowling member 14 which cooperates with the core engine 11 to define an annular duct 15. The annular duct 15 contains a fan propulsor 16, part of which can be seen in FIG. 1, which is mounted for rotation coaxially with the axis of the core engine 12 and is driven by conventional means (not shown) from the turbine of the core engine 12. In operation, air exhausted from the fan propulsor 16 and passing out of the downstream end or final nozzle 18 of the annular fan duct 15 in combination with exhaust gases exhausted from the core engine nozzle 13 provide the propulsive thrust of the ducted gan gas turbine engine 10.

The ducted fan gas turbine engine 10 is mounted from the underside of an aircraft wing 19 by a pylon 20.

Figure 7:
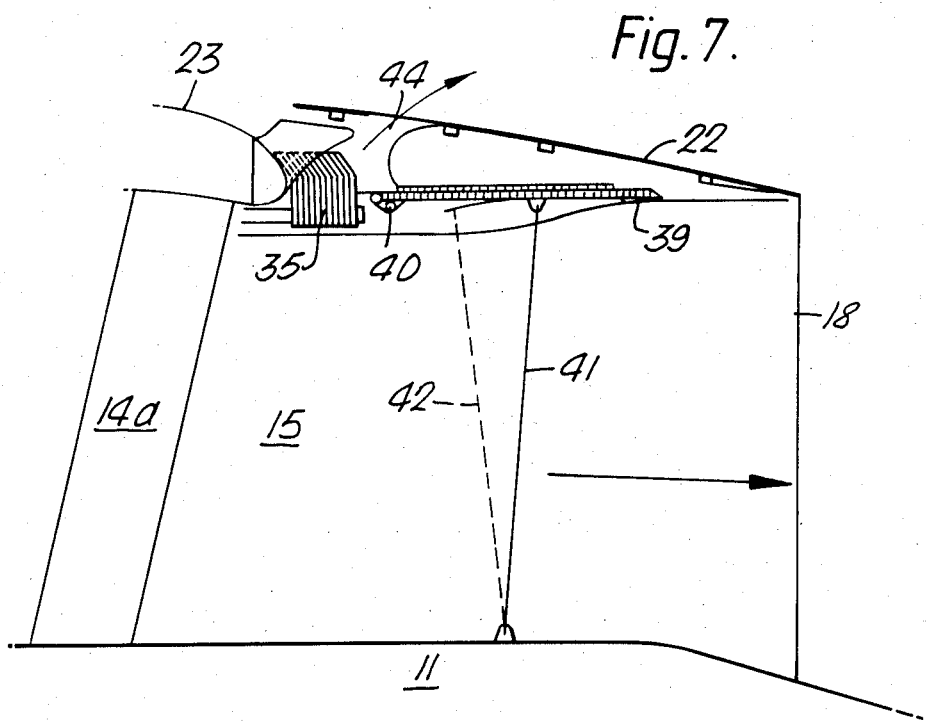
FIG. 7 is a sectioned side view of the thrust reverser of the gas turbine engine shown in FIGS. 1 and 2 in its non-deployed position but so arranged as to permit a bleed of air from the fan duct of the engine.

The cowling member 14 is made up of two portions 21 and 22. The first cowling portion 21 surrounds the fan propulsor 16 and is statically mounted from the core engine 11 by a plurality of generally radially extending strut members 14a, one of which can be seen in FIGS. 3,4 and 7. The second cowling portion 22 is located downstream of the fan propulsor 16 and is mounted from the first cowling portion 22 so as to be axially translatable (with respect to the engine axis 17) from the position shown in FIG. 1 to the position shown in FIG. 2.

During normal flight operation of the ducted fan gas turbine engine 10, the second cowling portion 22 is maintained in the position shown in FIG. 1 in which its is contiguous with the first cowling portion 21. In this position the outer surface of the cowling member 14 provides a generally smooth uninterrupted surface to air flowing in operation over the engine 10. However when it is desired to provide a reversal of the thrust of the engine 10 so as to provide a braking effect during aircraft landing, the second cowling portion 22 is axially translated to the position shown in FIG. 2. In that position, the resulting circumferential gap 23 between the cowling portions 21 and 22 reveals a generally annular array of fan air flow deflectors 24 which serve to deflect at least some of the air from the fan propulsor 16 in a generally upstream direction as indicated by the arrows 25. The nature of the fan air flow deflectors 24 and the way in which they function will become apparent if reference is now made to FIGS. 3–6.

In FIG. 3, the first and second cowling portion 21 and 22 are shown in contiguous relationship so that air from the fan propulsor 16 is exhausted through the downstream end 18 of the annular fan duct 15 in the direction indicated by the arrow 26 so as to contribute towards the propulsive thrust of the engine 10.

Figure 5:
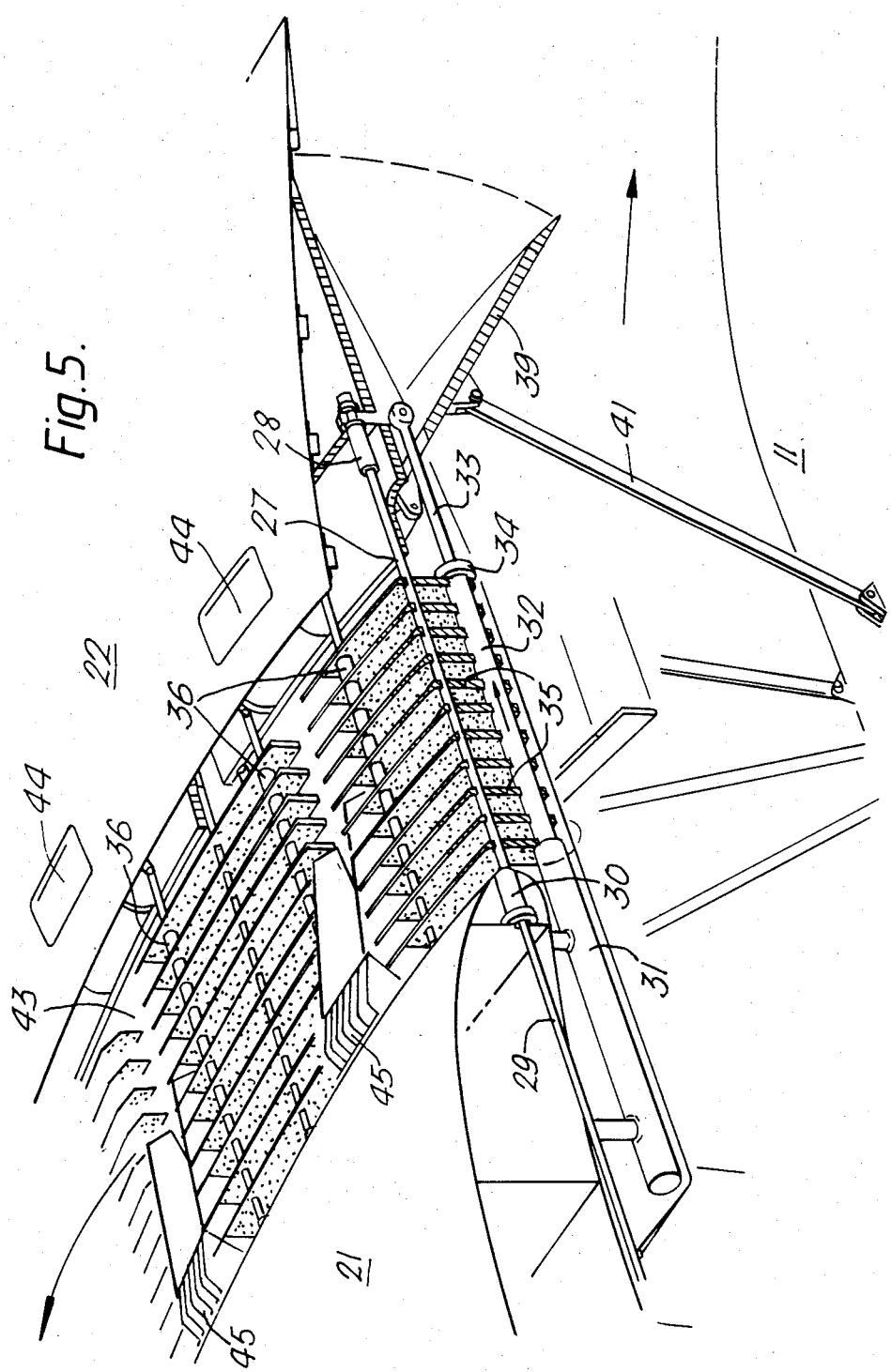
FIG. 5 is a detailed view of a portion of the thrust reverser shown in FIG. 4 in its deployed position.

The second cowling portion 22 is attached to the first cowling portion 21 by a plurality of rail members 27, one of which can be seen in FIG. 3. Each rail member 27 is fixedly attached at its downstream end 28 to the second cowling member 22 while the upstream portion 29 of each rail member 27 slidably locates in corresponding guide members 30 located within the first cowling portion 21. The mode of attachment of the rail members 27 to the first and second cowling portions 21 and 22 can be seen more easily if reference is made to FIG. 5. FIG. 5 also shows one of a plurality of double action hydraulic rams 31 which also interconnect the first and second cowling portions 21 and 22. The rams 31 each comprise two coaxial pistons 32 and 33 as can be seen in FIG. 5 which are independently operable. The function of the outer pistons 32 will be described later. The inner piston 33 of each ram 31 is attached to the second cowling portion 22 so that simultaneous actuation of the pistons 33 results in the axial translation of the second cowling portion 22, relative to the first cowling portion 21, the rail members 27 providing support for the second cowling portion 22 as they slide through the guide members 30. The second cowling portion 22 is axially translatable between the positions shown in FIGS. 3 and 4, FIG. 4 showing the maximum extent of translation.

The outer pistons 32, which can be seen most clearly in FIG. 5, each terminate in a flange 34 which is intended to limit the maximum axial movement of a plurality of airflow deflector vanes 35 one set of which is carried by each outer piston 32 which deflector vanes 35 constitute the fan air flow deflectors 24. More specifically, each deflector vane 35 is apertured in the region of its mid-point so as to be slidably mounted on the outer surface of its corresponding outer piston 32. A further aperture in the mid-point region of each deflector vane 35 permits a similar slidable mounting of the vanes 35 on the rail members 27. After the second cowling portion 22 has been translated by the inner pistons 33 to the position shown in FIG. 4, and the outer pistons 32 have been translated in a downstream direction, the deflector vanes 35 are blown by the air flow through the fan duct from their stacked, axially abutting position shown in FIG. 3 to the axially spaced apart position shown in FIG. 4. The flanges 34 on each of the outer pistons 32 limit the maximum amount the furthest downstream of the deflector vanes 35 can be translated. The regular axial spacing of the deflector vanes 35 when they are in their non-stacked positions is defined by a plurality of telescopic members 36; two telescopic members 36 being associated with each hydraulic ram 31 and its set of deflector vanes 35. Thus each of the deflector vanes 35 is apertured in the region of each of its ends so that it is supported at those ends by two of the telescopic members 36 as can be seen in FIG. 5.

Although all of the rail members 27 are shown as supporting deflector vanes 35, it will be appreciated that in certain circumstances it may be desirable to provide additional rail members which do not provide deflector vane 35 support and which are present solely to support the second cowling portion 22 from the first cowling portion 21.

Figure 6:
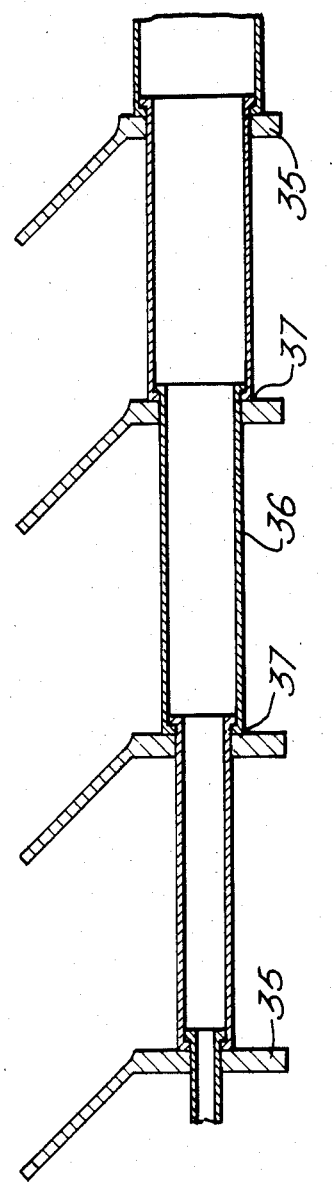
FIG. 6 is an enlarged sectioned side view of a portion of the thrust reverser of the ducted fan gas turbine engine in accordance with the present invention when in the deployed position.

The telescopic members 36 interconnect the first and second cowling portions 21 and 22 so that when the second cowling portion 22 is axially translated to the position shown in FIG. 4, each of the telescopic members opens up in the manner shown in FIG. 6. It will be appreciated that each of the telescopic members 36 comprises a plurality of cylindrical tubes of progressively larger diameter so that a plurality of shoulders 37 are defined on the outer surfaces of the telescopic members 36. It is these shoulders 37 which serve as stops for the deflector vanes 35 as they are blown in an axially downstream direction by the fan duct 15 air flow.

The sets of deflector vanes 35 extend around substantially the whole of the circumference of the annular cowling member 14 to constitute the fan air flow deflectors 24 and each is configured so that at least some of the air passing in operation through the fan duct 15 is deflected in a generally upstream direction as can be seen in FIGS. 2 and 4. More specifically the configuration of the vanes 35 and the outer surface of the annular cowling member 14 is such that the air flow deflected thereby attaches itself by virtue of the Coanda effect to the outer surface of the annular cowling member 14. This ensures that there is minimal interference of the aerodynamics of the wing 19 by the deflected fan air flow. An aerodynamic "trip" is provided on the upstream portion of the cowling portion 21 as indicated by the interrupted line 38 shown in FIGS. 1 and 2 so as to prevent any ingestion of the deflected fan air flow by the engine 10. The deflection of the fan airflow by the vanes 35 therefore provides a thrust reversal of at least part of the air flow through the fan duct 15 which is generally symmetrical. Since the airflow is symmetrical, the resultant bending loads upon the pylon 20 are limited, thereby permitting the use of a lightweight pylon 20.

In order to ensure that a large proportion of the air flow through the fan duct 15 is in fact deflected by the vanes 35, an annular array of blocker doors 39 is arranged to partially obturate the second cowling portion 22 when it has been axially translated to the position shown in FIG. 4. During normal flight operation of the engine 10, the blocker doors 39 are stowed in the position shown in FIG. 3 to define a portion of the radially inner surface of the second cowling portion 22. Each blocker door 39 is pivotally attached at its upstream end 40 to the second cowling portion 22 and also pivotally attached just upstream of its mid point to a link member 41. The link members 41 extend generally radially across the fan duct 15 and are pivotally attached to the outer surface of the core engine 11. The link members 41 are arranged so that as the second cowl member is axially translated in a downstream direction, the blocker doors 39 are pivoted into the position shown in FIG. 4 in which they partially obturate the fan duct 15.

Summarizing therefore, when it is desired to provide a thrust reversal of the air flow through the fan duct 15, the second cowling portion 22 is axially translated in a downstream direction by the inner pistons 33 so that a generally circumferential gap 23 is opened up between it and the first cowling portion 21. Translation of the second cowling portion 22 additionally results in the progressive partial obturation of the fan duct 15 by the blocker doors 39. Simultaneously with the axial translation of the second cowling portion 22, the outer pistons 32 are actuated so that the air flow through the fan duct 15 blows the deflector vanes 35 in a downstream direction along the rail members 27, the telescopic members 36 ensuring that the deflector vanes 35 are maintained in an axially spaced apart relationship.

The ducted fan gas turbine engine 10 is a low specific thrust engine. The optimum fan pressure ratio is modest and as a result at low aircraft speed, the final nozzle pressure ratio is below its choking value. The fan propulsor 16 is designed for efficient operation at altitude cruise conditions. However the fan propulsor 16 operating point at stationary under low speed conditions i.e. aircraft take-off, is close to the fan surge line or region of unstable operation. In order to reduce the possibility of surge occuring, the second cowling portion 22 is so adapted that on take-off or when any other conditions likely to result in the surging of the fan propulsor 16 are likely to occur, the area of the final nozzle 18 defined by the second cowling portion 22 is increased and some of the air flow passing through the fan duct 15 is bled to the exterior of the engine 10 before it reaches the downstream end 18 of the annular fan duct 15.

In order to achieve the necessary increase in area of the final nozzle 18, the link members 41 which interconnect blocker doors 39 with the core engine 11 are not truly radial, but, are slightly inclined in an axially upstream direction. This ensures that limited axial translation of the second cowling portion 22 in a downstream direction results in the link members 41 moving from their original positions indicated by an interrupted line 42 in FIG. 7 to the position shown by a full line. Limited pivoting of the blocker doors 39 in a radially outward direction brings about in turn an increase in the area of the final nozzle 18.

Figure 8:
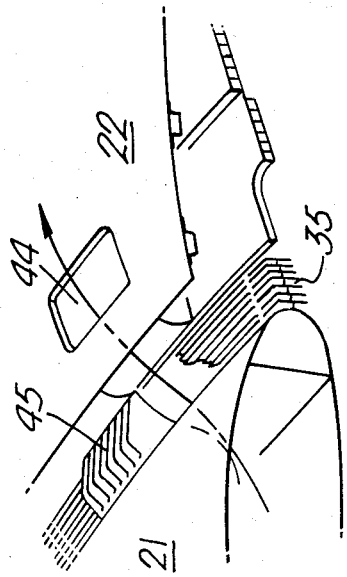
FIG. 8 is a detailed view of a portion of the thrust reverser in the position shown in FIG. 7.

Each set of deflector vanes 35 is circumferentailly spaced apart by a small distance from its adjacent set so that gaps 43 are defined between them. The gaps 43 are aligned with a series of bleed holes 44 provided in the second cowling portion 22. The bleed holes 44 are so positioned in the second cowling portion 22 that when the second cowling portion 22 is translated along only a part of its maximum travel to the position shown in FIG. 7 and the deflector vanes 35 are maintained in stacked relationship, air is permitted to bleed out from the fan duct 15 through the bleed holes 44 in the manner shown in FIGS. 7 and 8.

When the second cowling portion 22 is translated back to the position shown in FIG. 3 in which it is contiguous with the first cowling portion 21, the bleed holes 44 in the second cowling portion 22 are blocked by a series of plates 45 appropriately located as can be seen in FIG. 5 on the downstream edge of the first cowling portion 21.

It will be appreciated that if the fan propulsor 16 is not one which is designed to operate very close to the point at which surge occurs, the features of the bleed holes 44 and the fan duct 15 area increase provided by the blocker doors 39 may be omitted if so desired. It will also be appreciated that although the present invention has been described with reference to a ducted fan gas turbine engine 10 have a rearwardly mounted fan propulsor 16, it provides a compact effective thrust reverser which is equally applicable to ducted fan gas turbine engines having their fan propulsors located at other positions. Moreover although the invention has been described with reference to a ducted fan engine 10 provided with a single fan propulsor 16 more than one fan propulsor could be provided if so desired and if so such fan propulsors could be contrarotatable.

I claim:

1. A ducted fan gas turbine engine comprising a core engine having a fan propulsor and a cowling member surrounding and extending downstream of said fan propulsor, said cowling member being radially spaced apart from said core engine so that an annular gap is defined therebetween for the flow of air from said fan propulsor, said cowling member comprising a first static annular portion surrounding said fan propulsor and a second translatable annular portion downstream of said fan which is axially translatable from a first position in which it is contiguous with said first cowling portion and a second position in which a generally circumferential gap is defined between said cowling member portions, a plurality of generally axially extending support members interconnecting said second translatable cowling member portion with said first cowling member portion, a plurality of air flow deflecting members carried by said generally axially extending support members, said air flow deflecting members being translatable along said support members from a first position when said cowling members are contiguous in which said airflow deflecting members are stacked in a nested, axially abutting relationship to a second position when said circumferential gap is defined between said cowling member portions in which said air flow deflecting members are in axially spaced apart relationship and in which they occupy at least a major portion of the axial extent of said circumferential gap between said cowling member portions, and blocker means to at least partially obturate said annular fan air flow duct downstream of said air flow deflecting members when said cowling member portions are axially separated so that at least a portion of the flow of air operationally exhausted from said fan propulsor passes through said generally circumferential gap and is deflected by said air flow deflector means when in said axially spaced apart relationship, said air flow deflector members being so arranged when axially spaced apart to deflect said air flow in generally upstream direction.

2. A ducted fan gas turbine engine as claimed in claim 1 wherein said fan propulsor is mounted on the rearward portion of said core engine.

3. A ducted fan gas turbine engine as claimed in claim 1 wherein said generally axially extending support members are fixedly attached to said second translatable annular cowling portion and slidingly locate in said first cowling portion;

4. A ducted fan gas turbine engine as claimed in claim 1 wherein said blocker means comprises a plurality of blocker doors and link members, each blocker door being pivotally attached to said second translatable annular cowling portion and interconnected with said core engine by at least one link member in such a manner that upon the axial translation of said second translatable annular cowling portion from said first to said second position said blocker doors pivot from first positions in which they define at least a portion of the radially inner wall of said translatable annular cowling portion to second positions in which they collectively at least partially obturate said annular fan air flow duct.

5. A ducted fan gas turbine engine as claimed in claim 1 wherein said first and second annular cowling portions are additionally interconnected by a plurality of telescopic members which cooperate with said air flow deflecting members, said telescopic members extending with the axial translation of said second annular cowling portion from said first to second positions so as to provide a series of axially equally spaced apart shoulders defined by the joints between the portions of said telescopic members, said shoulders in turn serving to cooperate with said air flow deflector members to determine the axial spacing of said air flow deflector members.

6. A ducted fan gas turbine engine as claimed in claim 1 wherein said air flow deflector members and the radially outer surface of said fan cowling member have a configuration such that the air flow deflected in operation by said air flow deflector members attaches itself by virtue of the Coanda effect to said fan cowling member radially outer surface.

7. A ducted fan gas turbine engine as claimed in claim 1 wherein a plurality of hydraulic rams are provided on said first cowling member to axially translate said second translatable cowling member portion between said first and second positions thereof.

8. A ducted fan gas turbine engine as claimed in claim 7 wherein said hydraulic rams are additionally adapted to control the axial positioning of said air flow deflecting members independently of said axial translation of said second cowling member.

9. A ducted fan gas turbine engine as claimed in claim 1 wherein said cowling member is provided with a plurality of air bleed apertures downstream of said fan propulsor which are arranged in an annular array and interconnect the radially inner and outer surfaces of said second translatable cowling member, means being provided to obturate said air bleed apertures under normal engine operating conditions but to open to permit a flow of air from said fan propulsor through said air bleed apertures when said engine is operating under conditions in which surging of said fan propulsor may occur so as to increase the surge margin of said fan propulsor.

10. A ducted fan gas turbine engine as claimed in claim 9 wherein said air bleed apertures are located in said second translatable cowling member, said obturating means for said air bleed apertures comprising a plurality of plate members located on said first annular cowling portion which are so positioned as to obturate said air bleed apertures when said first and second cowling portions are in said first position in which they are contiguous but which do not obturate said air bleed apertures when said second translatable cowling member is translated to a position intermediate said first and second positions thereof and said air flow deflecting members are stacked in said axially abutting relationship.

11. A ducted fan gas turbine engine as claimed in claim 4 wherein said plurality of blocker doors and link members interconnecting said plurality of blocker doors with said core engine are arranged so that upon axial translation of said second translatable annular cowling portion from said first position to a position intermediate said first position and said second position, said blocker doors are pivoted in a radially outward direction so as to provide an increase in the cross-sectional area of the outlet nozzle of said annular fan duct, whereby an increase in the surge margin of said fan propulsor in provided.

* * * * *